United States Patent
Subramanya et al.

(10) Patent No.: US 12,432,257 B2
(45) Date of Patent: Sep. 30, 2025

(54) SIGNATURE QUALITY EVALUATION

(71) Applicant: Sophos Limited, Abingdon (GB)

(72) Inventors: Santosh Subramanya, Bangalore (IN); Shankar Jayaraman, Bangalore (IN)

(73) Assignee: Sophos Limited (GB)

( * ) Notice: Subject to any disclaimer, the term of this patent is extended or adjusted under 35 U.S.C. 154(b) by 513 days.

(21) Appl. No.: 17/750,737

(22) Filed: May 23, 2022

(65) Prior Publication Data

US 2023/0319116 A1  Oct. 5, 2023

(51) Int. Cl.
  *H04L 9/40* (2022.01)

(52) U.S. Cl.
  CPC ........ *H04L 63/205* (2013.01); *H04L 63/1408* (2013.01); *H04L 63/1441* (2013.01)

(58) Field of Classification Search
  None
  See application file for complete search history.

(56) References Cited

U.S. PATENT DOCUMENTS

| | | | | |
|---|---|---|---|---|
| 8,239,944 B1* | 8/2012 | Nachenberg | ........ | H04L 63/1416 713/188 |
| 8,312,537 B1* | 11/2012 | Nachenberg | .......... | H04L 63/145 705/64 |
| 8,782,790 B1* | 7/2014 | Smith | ................. | H04L 63/1441 726/24 |
| 9,485,272 B1* | 11/2016 | Roundy | .................. | H04L 63/14 |
| 10,721,245 B2* | 7/2020 | Song | .................. | H04L 63/1441 |
| 11,757,914 B1* | 9/2023 | Jakobsson | ............... | H04L 51/42 726/25 |
| 2017/0149830 A1* | 5/2017 | Kim | ..................... | H04L 63/1425 |
| 2017/0149831 A1* | 5/2017 | Kim | ........................ | H04L 63/20 |
| 2017/0264626 A1* | 9/2017 | Xu | ..................... | H04L 63/1425 |
| 2021/0168169 A1* | 6/2021 | Kim | ..................... | H04L 63/1466 |
| 2021/0400058 A1* | 12/2021 | Filonov | ............... | H04L 63/1416 |
| 2022/0171880 A1* | 6/2022 | Prokudin | .............. | G06F 21/564 |

* cited by examiner

*Primary Examiner* — Christopher C Harris
(74) *Attorney, Agent, or Firm* — Danielson Legal LLC (57) ABSTRACT

Systems and methods for scanning network activity. The methods include receiving at an interface connection data regarding a plurality of network connections, wherein the connection data includes a signature used to classify each of the plurality of network connections; determining, using one or more processors executing instructions stored on memory to provide a signature analysis engine configured to analyze the connection data, the signature is prohibitively prone to misclassifying network activity as malicious, wherein the determination is based on the analysis of the connection data; and implementing a signature policy to prevent the signature from misclassifying network activity as malicious.

20 Claims, 5 Drawing Sheets

FIG. 5

SIGNATURE QUALITY EVALUATION

CROSS-REFERENCE TO RELATED APPLICATIONS

The present application is the domestic filing of and claims the benefit of co-pending Indian Patent Application No. 202211019565, filed in India on Mar. 31, 2022.

TECHNICAL FIELD

The present application relates generally to systems and methods for monitoring network activity and, more particularly but not exclusively, to systems and methods for using signatures to monitor network activity.

BACKGROUND

Network threats may be detected by inspection at various levels. Many threat detection technologies operate by inspecting data in various states such as in transit, in storage, in memory, during processing, or the like, and then checking whether the data matches specific criteria provided as a signature. One or more signatures can be formulated to detect one or more threats such as ransomware, malware, malformed packets, software vulnerabilities, and other such threats or combinations thereof The quality of a signature directly affects its efficacy and therefore the efficacy of an overall signature pack. A signature of low quality may trigger on good or otherwise legitimate traffic. In this case, the trigger would be a false positive. False positives may negatively impact a network, such as by disrupting network activity, and at the very least may inconvenience an administrator.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for at least evaluating the quality of a signature. The embodiments herein provide an objective analysis of connection data associated with one or more network connection sessions, including a signature used to profile the network connection (s). Connection data may include, for example and without limitation, internet protocol (IP) address data associated with a source or destination of a connection, domain information associated with the connection, source and destination ports associated with the connection, or the like.

Based on the connection data, the embodiments herein may consider whether a signature's classification of network activity as malicious was a false positive, and whether a signature is prone to issue false positives. If a signature is prohibitively prone to issuing false positives, the embodiments herein may implement one or more signature policies to prevent the signature from misclassifying network activity as malicious.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Existing techniques for analyzing signature efficacy typically involve a reviewer manually reviewing data regarding how many times a signature was triggered. The reviewer may consider how the signature was written and, based on the reviewer's intuition and experience, predict how many triggers should be expected. The reviewer may then decide whether it is a "good" signature or if the signature is too prone to issue false positives.

This technique is undesirable as it is inherently subjective and left to the discretion of a reviewer based on their experience. For example, different reviewers may judge a signature differently based on their domain experience and intuition.

The embodiments herein provide novel systems and methods for evaluating signatures that are used for scanning network activity. Specifically, the embodiments herein may analyze connection data regarding a plurality of network connections. The connection data may include one or more signatures used to analyze each of the plurality of network connections. If a signature is prone to misclassifying network activity as malicious, the embodiments herein may implement one or more signature policies to prevent the signature from misclassifying network activity as malicious. The signature policy(ies) may involve disabling a signature or modifying a signature, for example.

Figure 1:
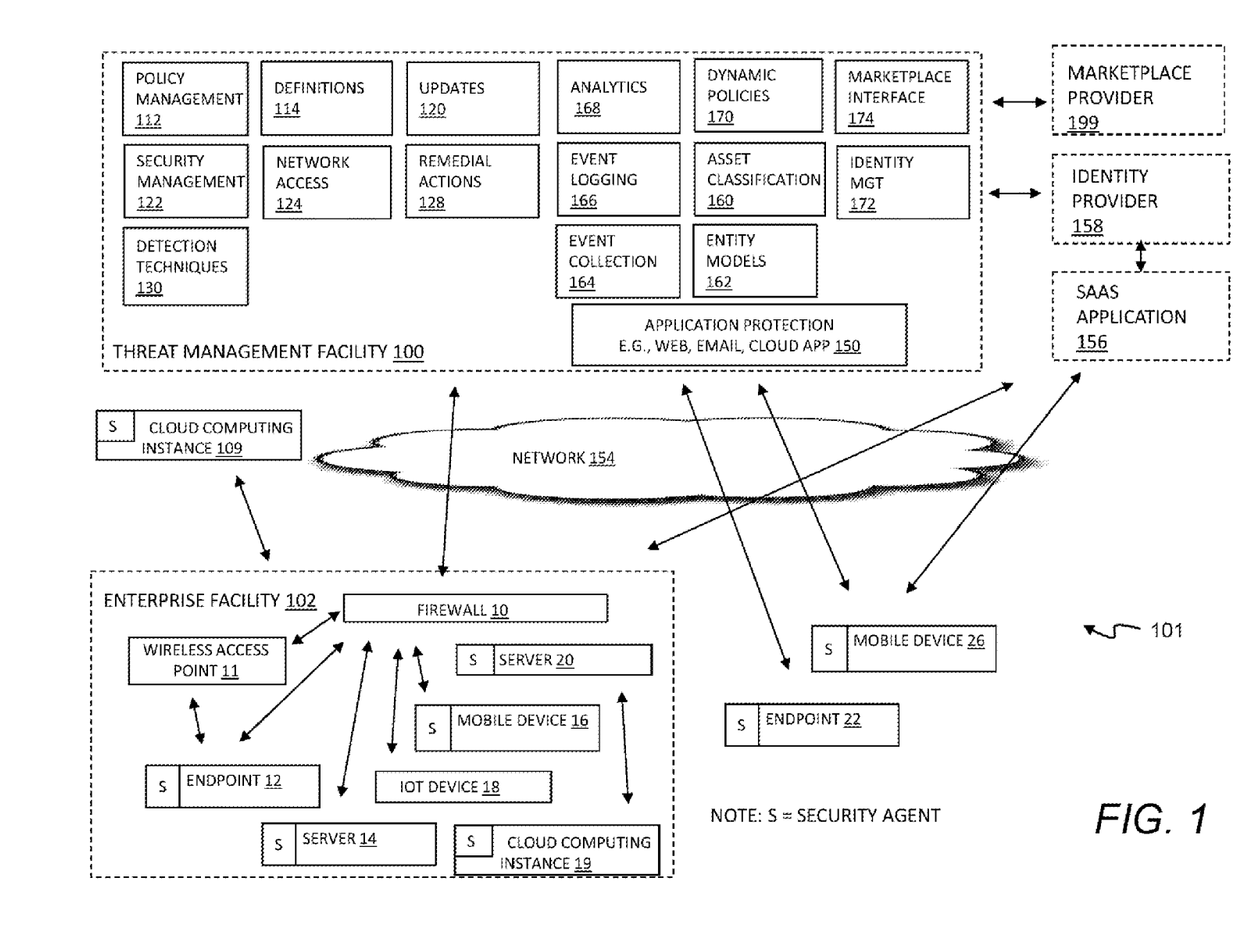
FIG. 1 illustrates a block diagram of a threat management system in accordance with one embodiment.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
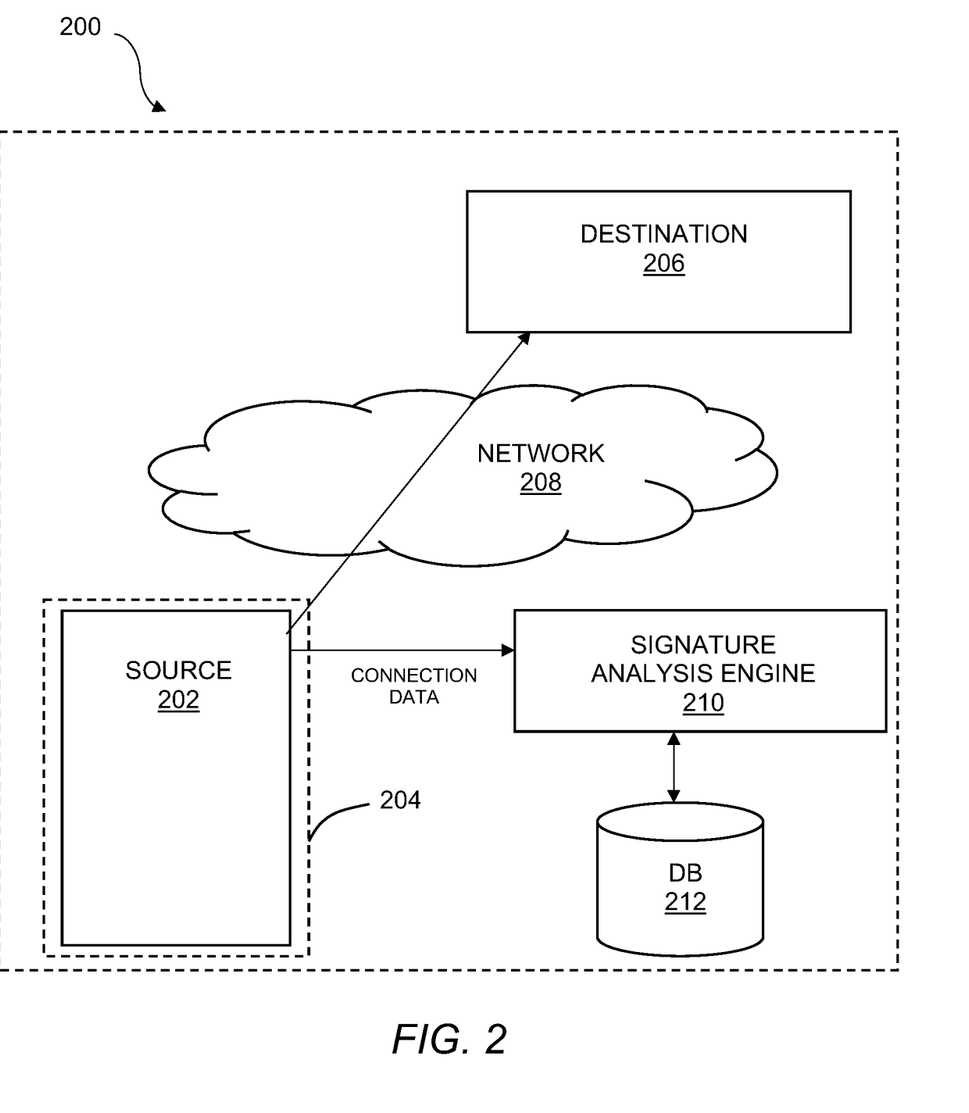
FIG. 2 illustrates a connection session in accordance with one embodiment.

FIG. 2 illustrates a connection session 200 in accordance with one embodiment. As seen in FIG. 2, a source 202 associated with an entity environment 204 initiates a connection with a destination 206 over a network 208. Also shown in FIG. 2 is a signature analysis engine 210 in communication with one or more databases 212. In the context of the present application, an "entity environment" may refer to a network location on which one or more endpoint devices such as those discussed in conjunction with FIG. 1 are reliant on signatures to detect malicious or otherwise harmful network activity.

The connection session 200 is an outgoing connection as the source 202 within the entity environment 204 is initiating a connection to a destination 206 external to the entity environment 204. The connection session 200 may be associated with different types of connection data. This connection data may include the IP address of the source 202 (source IP address), the IP address of the destination 206 (destination IP address), the port of the source 202 on which the connection is made (source port), the port of the destination 206 on which the connection is made (destination port), and the protocol used for the connection. Other types of data associated with the connection session in addition to or in lieu of the above may be considered as well. For example, the connection data may also include a signature identifier (SID) that identifies the signature used to classify the activity associated with the connection and a Uniform Resource Identifier (URI) associated with the connection.

In the connection session 200 of FIG. 2, the signature analysis engine 210 may consider, as part of the connection data, the reputation of the domain of the destination 206. This is possible because the connection data may include the URI data of the destination 206 to which the source 202 connected.

The signature analysis engine 210 may reference one or more databases 212 for reputation data regarding the domain associated with the destination 206. The one or more databases 212 may provide a rich source of domain reputation and IP reputation. This may be publicly available data or data provided by a private entity.

In the context of the present application, "IP reputation" may refer to the trustworthiness of a network location as it applies to internet communications and/or information. For example, an IP address with a "good" or "strong" reputation is a trustworthy location for internet communications and/or information.

IP addresses associated with The Onion Router (TOR) nodes, proxy networks, botnet servers, command-and-control servers, phishing sites, and other sites hosting or otherwise associated with malware are malicious and, as such, would have a bad reputation. As traffic from these network locations is generally malicious, connections from IP addresses associated with these locations may also be classified as malicious. If a signature is triggered on traffic from these types of locations, there is a high probability that the traffic is malicious and therefore the trigger is likely not a false positive.

In the context of the present application, "domain reputation" may refer to the trustworthiness of a website associated with a domain being analyzed. A domain having a "good" or "strong" reputation means the website corresponding to that address is trustworthy. These domains generally host good or benign content and are not associated with malicious, illegal, or otherwise unfavorable activity. Traffic associated with such websites or networks generally do not serve or send malicious content to clients. Accordingly, if a signature is triggered on traffic from these websites or networks, the probability of the trigger being a false positive is high.

In summary, the above-discussed reputations may help determine whether a trigger is a false positive. That is, if a signature triggers on traffic from a trusted IP address, network, or server, the probability of the trigger being a false positive is high.

If the domain of the destination 206 has or is associated with a bad reputation (e.g., it is known to be a malicious server or a command-and-control server), then the connection session 200 should be flagged as a malicious connection. If a signature is triggered, then it would be a legitimate trigger and not a false positive.

On the other hand, if the domain reputation is good (i.e., not malicious), the connection should not be flagged as a malicious connection. If the signature is triggered, it would be a false positive.

Figure 3:
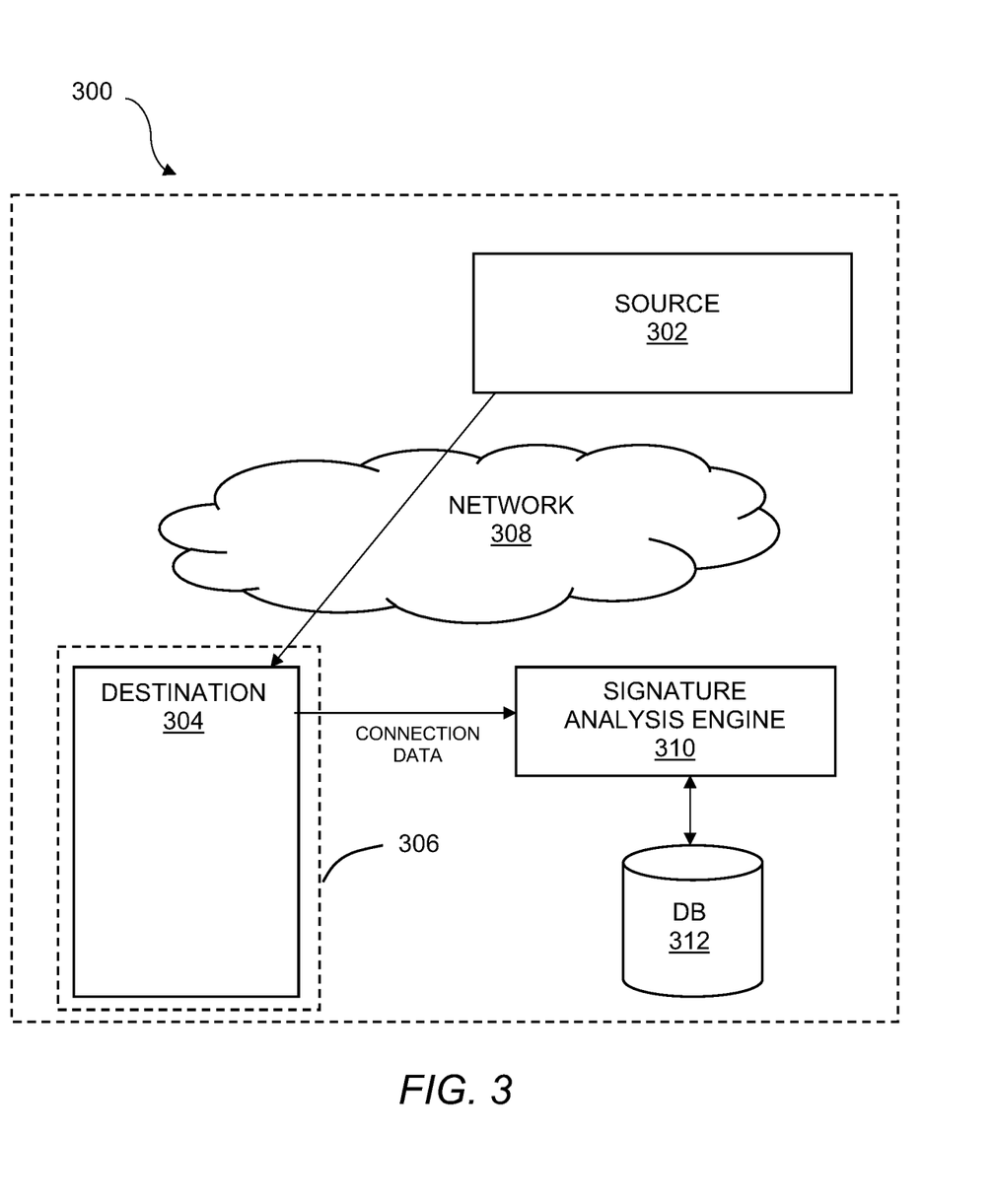
FIG. 3 illustrates a connection session in accordance with another embodiment.

FIG. 3 illustrates a connection session 300 in accordance with another embodiment. As seen in FIG. 3, a source 302 initiates a connection with a destination 304 associated with a entity environment 306 over a network 308. Also shown in FIG. 3 is a signature analysis engine 310 in connection with one or more databases 312.

The connection session 300 of FIG. 3 is an inbound connection as the source 302 is external to the entity environment 306 and initiates a connection to a computing device (i.e., the destination 304) within the entity environment 306. That is, a server or device from the internet is attempting to connect to a service or device in the entity environment 306.

Since connection session 300 is an inbound connection, there may be a risk the source 302 sends malicious traffic to the destination 304 or to the entity environment 306 in general. The connection session 300 may be associated with connection data such as the connection data discussed in conjunction with FIG. 2.

In the connection session 300 of FIG. 3, the signature analysis engine 310 may collect IP address data associated with the source 302. The signature analysis engine 310 may then reference one or more databases 312 for reputation data associated with the IP address of the source 302.

If the IP reputation data associated with the source 302 is bad (e.g., it suggests the source 302 is associated with malicious activity or a malign network location), then the connection session 300 should be flagged as a malicious connection. If a signature were to trigger in this case, it would be a legitimate trigger.

On the other hand, if the IP reputation data associated with the source is good (e.g., it suggests the source 302 is not associated with malicious activity or a malign network location), then the connection session 300 should not be flagged as a malicious connection. If a signature were to trigger in this case, it would be a false positive.

FIGS. 2 and 3 are discussed in the context of a single connection session. In operation, a signature analysis engine may collect connection data for a plurality of connection sessions involving a particular signature.

Figure 4:
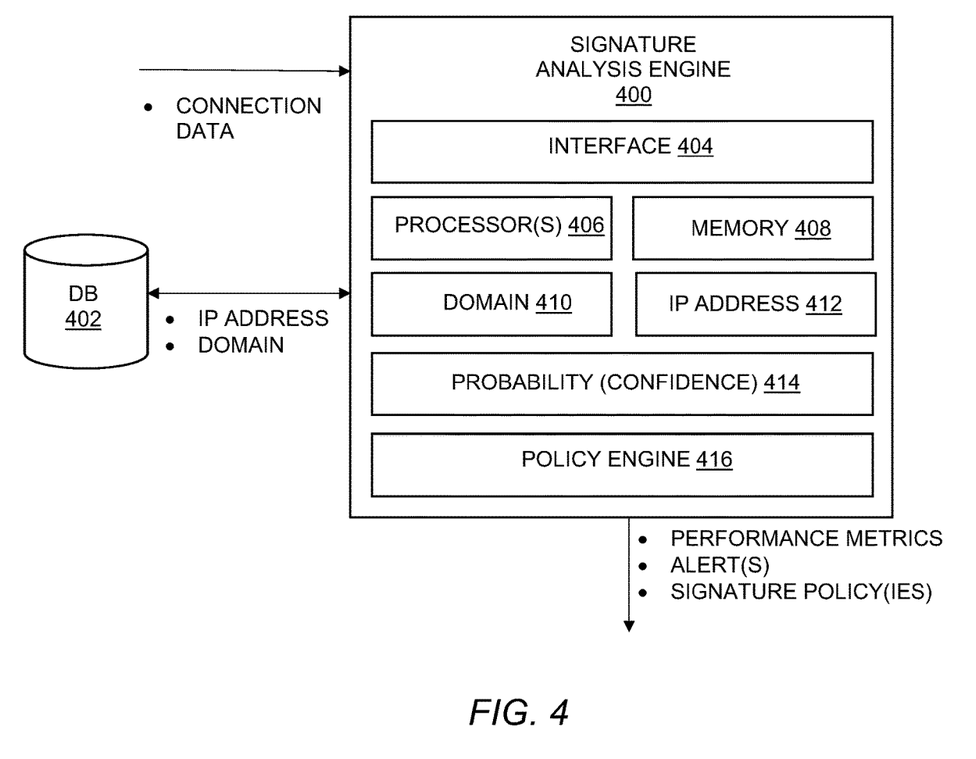
FIG. 4 illustrates a signature analysis engine in accordance with one embodiment.

FIG. 4 illustrates a signature analysis engine 400 in accordance with one embodiment. The signature analysis engine 400 may be similar to the signature analysis engines 210 and 310 of FIGS. 2 and 3, respectively.

The signature analysis engine 400 may be in communication with one or more databases 402 for referencing IP address reputation data, domain reputation data, or both. The signature analysis engine 400 may include an interface 404 for receiving the connection data from an entity environment or a computing device regarding a connection session. For example, the signature analysis engine 400 may be in communication with the security management facility 122 or the event logging facility 166 of FIG. 1 to obtain connection data. The interface 404 may also receive IP address data, domain data, or both, from one or more databases 402.

The signature analysis engine 400 may include one or more processors 406 executing instructions stored on memory 408 to evaluate a signature. The one or more processors 406 may be any hardware device capable of executing instructions stored on memory 408 to provide various subsystems, components, or modules. These may include, but are not limited to, a domain analysis module 410, an IP address analysis module 412, a probability module 414, and a policy engine 416.

The processor(s) 406 may include a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor(s) 406 may be a hardware security device, a user device, or a device located at some remote geographic location.

The memory 408 may be L1, L2, L3 cache, or RAM memory configurations. The memory 408 may include non-volatile memory such as flash memory, EPROM, EEPROM, ROM, and PROM, or volatile memory such as static or dynamic RAM, as discussed above. The exact configuration/type of memory 408 may of course vary as long as instructions for operating the signature analysis engine 400 may be executed.

For outgoing sessions, such as in FIG. 2, the signature analysis engine 400 may reference the one or more databases 402 for domain reputation data and IP reputation data, whichever is available, for all sessions. P(A) can represent the probability that a signature is prone to issue a false positive based on domain reputation data alone, and may be calculated by the domain analysis module 410 by:

$$P(A) = \frac{\text{Number of good sessions on which sig. triggered based on domain data}}{\text{Number of sessions for which domain data is available}} \quad \text{(Eq. 1)}$$

Similarly, P(B) can represent the probability that a signature is prone to issue a false positive based on IP reputation data alone. This may be calculated by the IP address analysis module 412 by:

$$P(B) = \frac{\text{Number of good sessions on which Sig. triggered based on IP data}}{\text{Number of Sessions for which IP data is available}} \quad \text{(Eq. 2)}$$

If only one of domain or IP reputation data is available, then only that data will be used to analyze a signature. If domain reputation data and IP reputation data are available, then the total probability P of a signature being prone to false positives may be calculated by the probability module 414 by:

$$P = P(A) * P(B) \quad \text{(Eq. 3)}$$

As an example, Signature1234 may be involved in classifying network activity over one hundred (100) connection sessions. If these are inbound connections, only IP address data may be available. Accordingly, only IP address data is used to calculate how prone the signature is in issuing false positives. The IP address analysis module 414 may check the IP reputation data for all unique IP addresses of the 100 sessions. If the total number of good sessions on which Signature1234 was triggered was twenty (20), the probability of the Signature1234 being prone to issuing false positives may be calculated using Eq. 2 above as:

$$P(B)_{1234} = \frac{20}{100} = 20\% \ (0.20)$$

The probability module 414 may also assign a confidence score to a signature based on the signature's calculated probability of being prone to issuing false positives, such that the probability and confidence score add up to one. For example, the confidence score associated with Signature1234 would be 80%.

As another example, Signature5678 may be involved in classifying network activity over one hundred (100) connection sessions. If these are outbound connections, domain reputation data and IP address reputation data associated with the destination may be available. For example, domain information and IP address information associated with the destination may both be available and considered.

If there were twenty (20) good sessions on which the signature was triggered based on domain reputation data alone, and there were sixty sessions that had domain data available, Eq. 1 may be used to calculate P(A) as follows:

$$P(A)_{5678} = \frac{20}{60} = 33\% \ (0.33)$$

If there were thirty (30) good sessions on which the signature was triggered based on IP address reputation data alone, and there were one hundred (100) sessions that had IP address data available, Eq. 2 may be used to calculate P(B) as follows:

$$P(B)_{5678} = \frac{30}{100} = 30\% \ (0.30)$$

Because domain data and IP address data are both available, Eq. 3 may be used to calculate the total probability P of Signature5678 being prone to issuing false positives as follows:

$$P_{5678}=(0.33)*(0.30)=0.09 (9\%)$$

This would result in a confidence score for this signature of 91%. As can be seen, the lower the probability of a signature being prone to issue false positives, the higher the confidence score will be. If the probability of a signature being prone to false positives is 10%, the confidence score of that signature will be 90%.

Similarly, the higher the probability of a signature being prone to issuing false positives, the lower the confidence score will be. For example, if the probability of a signature being prone to issuing false positives is 90%, the confidence score of the signature will be 10%.

The described embodiments may prioritize signatures that have a high probability of issuing false positives or otherwise those with low confidence scores. For example, if a signature is assigned a confidence score below some threshold (e.g., 90%), the policy engine 416 may implement one or more security policies such as presenting one or more alerts to an administrator or preventing the signature from misclassifying network activity as malicious.

The signature policy(ies) implemented by the policy engine 416 may vary and may depend on the application. If a signature is in an "enabled" state and as actively monitoring network activity, an administrator may define a threshold for a confidence score below which a signature policy will be implemented. For example, if the confidence score of a signature drops below 90%, the signature policy may involve disabling the signature. Additionally, or alternatively, an administrator may review the signature and modify the signature as appropriate.

In some embodiments, a signature may analyze network activity or connection data associated therewith in a containerized or simulated environment. In these cases, an administrator may define a confidence score, at or above which, a signature will be enabled to monitor actual network activity. For example, if a signature produces a confidence score of 90% or higher in a simulated environment, it will be enabled and used to monitor actual network traffic.

Figure 5:
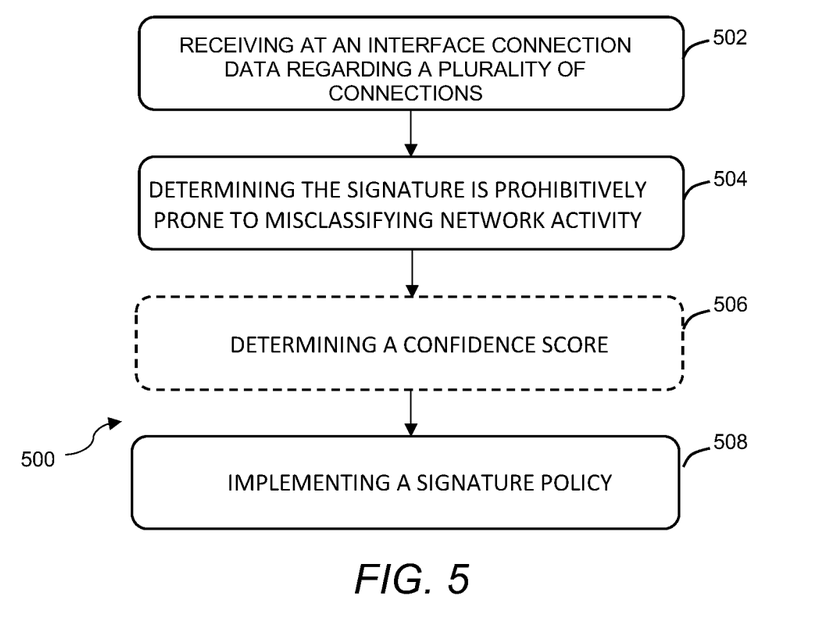
FIG. 5 depicts a flowchart of a method for evaluating a signature for scanning network activity in accordance with one embodiment.

FIG. 5 depicts a flowchart of a method 500 for evaluating a signature for scanning network activity in accordance with one embodiment. The systems or components thereof of any one of FIGS. 1-4 may perform the steps of method 500.

Step 502 involves receiving at an interface connection data regarding a plurality of network connections, wherein the connection data includes a signature used to classify each of the plurality of network connections. As discussed above, the connection data may also include the source IP address, destination IP address, source port(s), destination port(s), number of total sessions, signature identifier, domain information associated with the connection, or the like.

Step 504 involves determining, using one or more processors executing instructions stored on memory to provide a signature analysis engine configured to analyze the connection data, the signature is prohibitively prone to misclassifying network activity as malicious, wherein the determination is based on the analysis of the connection data. As discussed above, the analysis may involve determining the reputations of domains or IP addresses associated with connection sessions.

In the context of the present application, "prohibitively prone to misclassifying network activity as malicious" may refer to a signature's tendency to issue false positives more frequently than is desired or acceptable. This threshold may be defined by an administrator. For example, an administrator may specify that if a signature has a 5% probability of misclassifying network activity as malicious, and therefore issuing false positives, the signature is prohibitively prone to misclassifying network activity as malicious.

Step 506 may be optional and involves determining a confidence value associated with the determination that the signature is prohibitively prone to misclassifying network activity as malicious. As discussed above, the confidence value may be related to the calculated probability of a signature being prone to issuing a false positive. Although the signature policy(ies) discussed above are implemented upon a confidence score meeting or failing to meet some threshold, they may similarly be implemented upon a probability of issuing a false positive meeting or failing to meet some threshold.

Step 508 involves implementing a signature policy to prevent the signature from misclassifying network activity as malicious. The signature policy may involve disabling the signature or modifying the signature, for example.

According to one aspect, embodiments relate to a method for scanning network activity. The method includes receiving at an interface connection data regarding a plurality of network connections, wherein the connection data includes a signature used to classify each of the plurality of network connections; determining, using one or more processors executing instructions stored on memory to provide a signature analysis engine configured to analyze the connection data, the signature is prohibitively prone to misclassifying network activity as malicious, wherein the determination is based on the analysis of the connection data; and implementing a signature policy to prevent the signature from misclassifying network activity as malicious.

In some embodiments, the connection data includes domain data associated with each of the plurality of network connections, and the method further includes comparing the domain data to a data store of labeled domains.

In some embodiments, the connection data includes internet protocol (IP) address data associated with each of the plurality of network connections, and the method further includes comparing the IP address data to a data store of labeled IP addresses.

In some embodiments, implementing the signature policy includes modifying the signature to be at least less likely to misclassify network activity as malicious.

In some embodiments, implementing the signature policy includes disabling the signature to prevent the signature from scanning network activity.

In some embodiments, the method further includes determining a confidence value associated with the determination that the signature is prohibitively prone to misclassifying network activity as malicious. In some embodiments, the signature policy is implemented upon the confidence value exceeding a threshold value.

In some embodiments, determining that the signature is prohibitively prone to misclassifying network activity as malicious includes calculating a probability that the signature will misclassify network activity as malicious. In some embodiments, the calculated probability is based on at least one of a domain probability that the signature is likely to misclassify network activity as malicious based on domain data of the connection data, and an internet protocol (IP) probability that the signature is likely to misclassify network activity as malicious based on IP address data of the connection data.

In some embodiments, the determination that the signature is prohibitively prone to misclassifying network activity as malicious is made without knowledge of content of the signature.

According to another aspect, embodiments relate to a system for scanning network activity. The system includes an interface for at least receiving connection data regarding a plurality of network connections, wherein the connection data includes a signature used to classify each of the plurality of network connections; and one or more processors executing instructions stored on memory to provide a signature analysis engine that is configured to determine, using one or more processors executing instructions stored on memory to provide a signature analysis engine configured to analyze the connection data, the signature is prohibitively prone to misclassifying network activity as malicious, and implement a signature policy to prevent the signature from misclassifying network activity as malicious.

In some embodiments, the connection data includes domain data associated with each of the plurality of network connections, and the method further includes comparing the domain data to a data store of labeled domains.

In some embodiments, the connection data includes internet protocol (IP) address data associated with each of the plurality of network connections, and the method further includes comparing the IP address data to a data store of labeled IP addresses.

In some embodiments, the signature analysis engine implements the signature policy by modifying the signature to be at least less likely to misclassify network activity as malicious.

In some embodiments, the signature analysis engine implements the signature policy by disabling the signature to prevent the signature from scanning network activity.

In some embodiments, the signature analysis engine is further configured to determine a confidence value associated with the determination that the signature is prohibitively prone to misclassifying network activity as malicious. In some embodiments, the signature analysis engine implements the signature policy upon the confidence value exceeding a threshold value.

In some embodiments, the signature analysis engine determines the signature is prohibitively prone to misclassifying network activity as malicious by calculating a probability that the signature will misclassify network activity as malicious. In some embodiments, the calculated probability is based on at least one of a domain probability that the signature is likely to misclassify network activity as malicious based on domain data of the connection data, and an internet protocol (IP) probability that the signature is likely to misclassify network activity as malicious based on IP address data of the connection data.

In some embodiments, the signature analysis engine determines that the signature is prohibitively prone to misclassify network activity as malicious without knowledge of content of the signature.

In this way, the foregoing methods and systems a provide an improved manner in evaluating the efficacy or quality of signatures. This improves network performance by reducing false positives, which may be detrimental to a network's operation. For example, a single false positive may block traffic or even shut down entire services.

The embodiments herein perform an objective analysis on a signature's performance (whether in monitoring actual network activity or in a simulated environment) to determine whether the signature is prohibitively prone to misclassifying network activity as malicious. This is opposed to existing techniques, which are inherently dependent on the biases and subjectivity of a threat reviewer.

Accordingly, the embodiments herein ensure only high quality signatures are used to analyze network activity. It follows that malicious activity is detected and remedied, while benign traffic is allowed. Additionally, the described analysis is performed without requiring knowledge of the actual content of a connection session.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for evaluating a signature for scanning network activity, the method comprising:
   receiving at an interface connection data regarding a plurality of network connections, wherein the connection data includes:
      a signature used to classify each of the plurality of network connections, and
      a domain of a destination of each of the plurality of network connections;
   determining, using one or more processors executing instructions stored on memory to provide a signature analysis engine configured to analyze the connection data, the signature is prone to misclassifying network activity as malicious based on the analysis of the connection data, wherein the signature is determined to be prone to misclassifying network activity as malicious based on the signature having a greater than a threshold probability of misclassifying network activity as malicious, wherein the threshold probability is based on a number of connection sessions on which a signature triggered based on domain data and a number of sessions for which domain data is available; and
   implementing a signature policy to prevent the signature from misclassifying network activity as malicious.

2. The method of claim 1, wherein the method further includes comparing the domain data to a data store of labeled domains.

3. The method of claim 1, wherein the connection data includes internet protocol (IP) address data associated with each of the plurality of network connections, and the method further includes comparing the IP address data to a data store of labeled IP addresses.

4. The method of claim 1, wherein implementing the signature policy includes modifying the signature to be at least less likely to misclassify network activity as malicious.

5. The method of claim 1, wherein implementing the signature policy includes disabling the signature to prevent the signature from scanning network activity.

6. The method of claim 1, further comprising determining a confidence value associated with the determination that the signature is prone to misclassifying network activity as malicious.

7. The method of claim 6, wherein the signature policy is implemented upon the confidence value exceeding a threshold value.

8. The method of claim 1 wherein determining that the signature is prone to misclassifying network activity as malicious includes calculating a probability that the signature will misclassify network activity as malicious.

9. The method of claim 8 wherein the calculated probability is further based on
   an internet protocol (IP) probability that the signature is likely to misclassify network activity as malicious based on IP address data of the connection data.

10. The method of claim 1 wherein the determination that the signature is prone to misclassifying network activity as malicious is made without knowledge of content of the signature.

11. A system for evaluating a signature for scanning network activity, the system comprising:
   an interface for at least receiving connection data regarding a plurality of network connections, wherein the connection data includes:
      a signature used to classify each of the plurality of network connections, and
      a domain of a destination of each of the plurality of network connections; and
   one or more processors executing instructions stored on memory to provide a signature analysis engine that is configured to:
   determine, using one or more processors executing instructions stored on memory to provide a signature analysis engine configured to analyze the connection data, the signature is prone to misclassifying network activity as malicious, wherein the signature is determined to be prone to misclassifying network activity as malicious based on the signature having a greater than a threshold probability of misclassifying network activity as malicious, wherein the threshold probability is based on a number of connection sessions on which a signature triggered based on domain data and a number of sessions for which domain data is available; and
   implement a signature policy to prevent the signature from misclassifying network activity as malicious.

12. The system of claim 11, wherein the signature analysis engine is further configured to compare the domain data to a data store of labeled domains.

13. The system of claim 11 wherein the connection data includes internet protocol (IP) address data associated with each of the plurality of network connections, and the signature analysis engine is further configured to compare the IP address data to a data store of labeled IP addresses.

14. The system of claim 11, wherein the signature analysis engine implements the signature policy by modifying the signature to be at least less likely to misclassify network activity as malicious.

15. The system of claim 11, wherein the signature analysis engine implements the signature policy by disabling the signature to prevent the signature from scanning network activity.

16. The system of claim 11 wherein the signature analysis engine is further configured to determine a confidence value associated with the determination that the signature is prone to misclassifying network activity as malicious.

17. The system of claim 16 wherein the signature analysis engine implements the signature policy upon the confidence value exceeding a threshold value.

18. The system of claim 11, wherein the signature analysis engine determines the signature is prone to misclassifying network activity as malicious by calculating a probability that the signature will misclassify network activity as malicious.

19. The system of claim 18, wherein the calculated probability is further based on
   an internet protocol (IP) probability that the signature is likely to misclassify network activity as malicious based on IP address data of the connection data.

20. The system of claim 11, wherein the signature analysis engine determines that the signature is prone to misclassify network activity as malicious without knowledge of content of the signature.

* * * * *